(12) United States Patent
Ekler et al.

(10) Patent No.: US 12,706,329 B2
(45) Date of Patent: Aug. 11, 2026

(54) BATTERY MANAGEMENT CIRCUITS WITH ADJUSTABLE CURRENT TRIMMING FOR IMPROVED CURRENT CONSUMPTION MATCHING

(71) Applicant: Infineon Technologies AG, Neubiberg (DE)

(72) Inventors: Markus Ekler, Feldkirchen (DE); Christian Walther, Munich (DE); Christian Heiling, Graz (AT); Mario Fuchs, Graz (AT)

(73) Assignee: Infineon Technologies AG, Neubiberg (DE)

( * ) Notice: Subject to any disclaimer, the term of this patent is extended or adjusted under 35 U.S.C. 154(b) by 774 days.

(21) Appl. No.: 18/298,941

(22) Filed: Apr. 11, 2023

(65) Prior Publication Data

US 2024/0347788 A1 Oct. 17, 2024

(51) Int. Cl.

*H01M 10/42* (2006.01)
*H01M 10/44* (2006.01)
*H02J 7/56* (2026.01)
*H02J 7/94* (2026.01)

(52) U.S. Cl.

CPC ....... *H01M 10/425* (2013.01); *H01M 10/441* (2013.01); *H02J 7/56* (2026.01); *H02J 7/94* (2026.01); *H01M 2010/4271* (2013.01)

(58) Field of Classification Search

CPC ............. H01M 10/425; H01M 10/441; H01M 2010/4271; H02J 7/0019; H02J 7/00714

See application file for complete search history.

(56) References Cited

U.S. PATENT DOCUMENTS 10,807,487 B2 * 10/2020 Wu .......................... B60L 58/22
2009/0225571 A1 * 9/2009 Eldery .............. H02M 7/53873 363/41
2013/0135904 A1 * 5/2013 Murayama ........ H02M 3/33561 363/17
2016/0380443 A1 * 12/2016 Jeon .......................... H02J 7/52 320/112

(Continued)

OTHER PUBLICATIONS

Infineon, "TLE9012DQU Li-Ion battery monitoring and balancing IC", Infineon Technologies AG, Jan. 24, 2022, 76 pp., URL: https://www.infineon.com/cms/en/product/battery-management-ics/tle9012dqu/.

*Primary Examiner* — Ryan Johnson
*Assistant Examiner* — Esayas G Yeshaw
(74) *Attorney, Agent, or Firm* — Shumaker & Sieffert, P.A.

(57) ABSTRACT

In some examples, this disclosure describes a method of operating a plurality of battery management circuits of a battery management system associated with an electric device. The method may comprise adjusting a first trim value associated with a first battery management circuit during operation of the electric device, and adjusting a second trim value associated with a second battery management circuit during operation of the electric device. The method may also comprise sinking a first amount of current in the first battery management circuit based on the first trim value; and sinking a second amount of current in the second battery management circuit based on the second trim value, wherein sinking the first amount of current and sinking the second amount of current causes the first battery management circuit and the second battery management circuit to consume substantially similar amounts of current.

22 Claims, 7 Drawing Sheets

(56) References Cited

U.S. PATENT DOCUMENTS

| | | | | |
|---|---|---|---|---|
| 2019/0176636 | A1* | 6/2019 | Wu | B60L 58/22 |
| 2023/0048191 | A1* | 2/2023 | Li | H02J 7/54 |
| 2025/0192575 | A1* | 6/2025 | Lee | H02J 7/54 |
| 2025/0286388 | A1* | 9/2025 | Lee | H02J 7/56 |

* cited by examiner

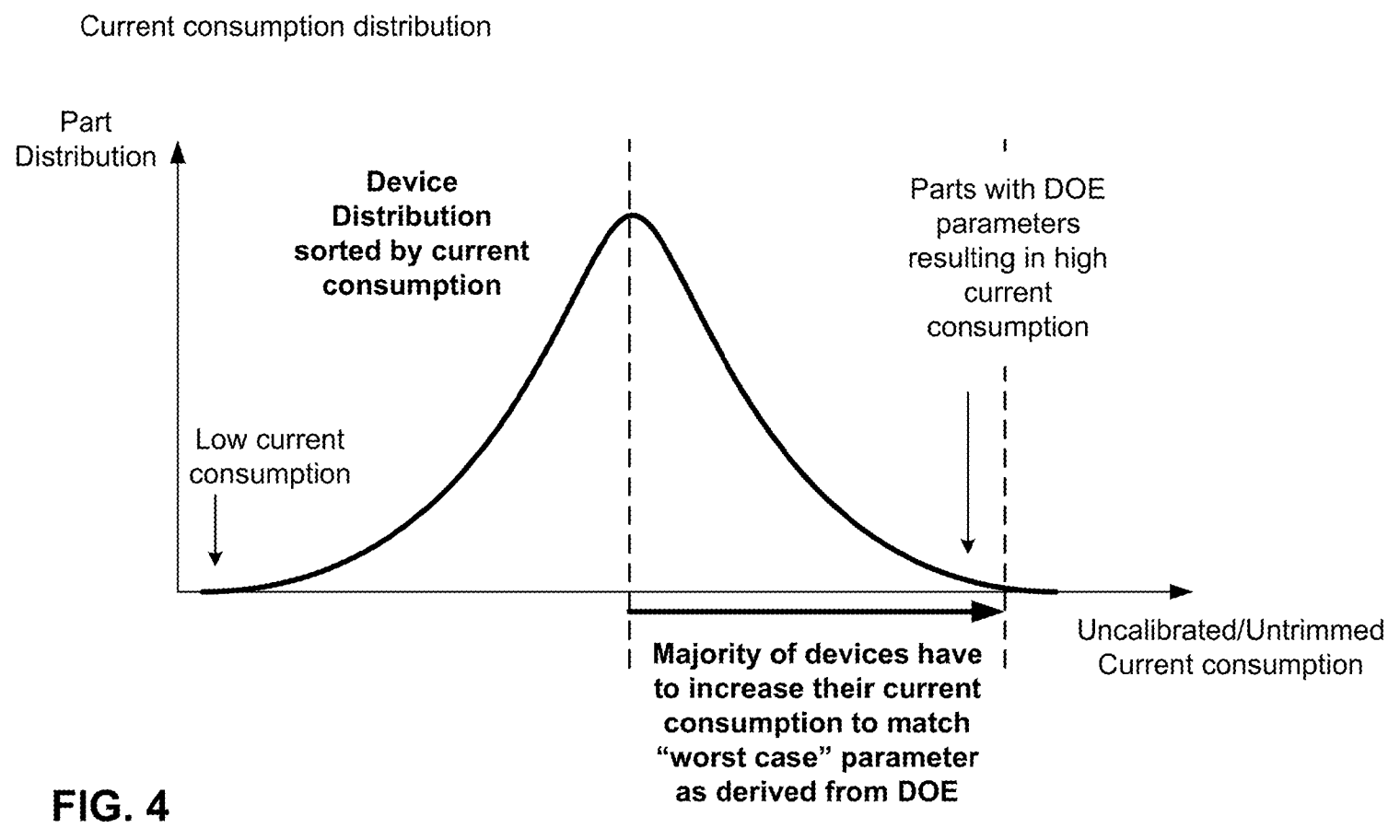

Current consumption distribution

Part Distribution

Low current consumption

Device Distribution sorted by current consumption

Parts with DOE parameters resulting in high current consumption

Majority of devices have to increase their current consumption to match "worst case" parameter as derived from DOE

Uncalibrated/Untrimmed Current consumption

FIG. 4

BATTERY MANAGEMENT CIRCUITS WITH ADJUSTABLE CURRENT TRIMMING FOR IMPROVED CURRENT CONSUMPTION MATCHING

TECHNICAL FIELD

This disclosure relates to battery management circuits for electric vehicles or other battery powered devices.

BACKGROUND

Battery powered devices, such as electric vehicles, often include many battery cells connected in series to form a battery system for the battery powered device. For such battery systems, battery management systems (BMSs) are often used for battery cell monitoring, thermal monitoring, cell balancing, or other battery management functions.

High voltage BMSs, such as those used for electric vehicles, often use several different battery management circuits in order to monitor all of the battery cells of a battery powered device. For example, each of the battery management circuits may monitor a subset of the battery cells of a battery system that is used to provide power to a battery powered device. Battery management circuits may be capable of monitoring voltages and temperatures of several cells and may perform cell balancing or other battery management functions on the different battery cells. The number of channels for each battery management circuit, however, may be limited, and therefore, several battery management circuits may be needed within a BMS in order to monitor all of the cells of a battery system.

For example, an electrical vehicle may include a battery system with one hundred or more battery cells connected in series, but battery monitoring circuits may include a more limited number of channels, e.g., only twelve channels. In this case, nine battery monitoring circuits may be needed within a BMS to monitor all one hundred cells of the battery system. Of course, the number of cells used in a given battery system can vary, and the number of channels in each BMS can also vary.

SUMMARY

This disclosure is directed to battery cell management circuits and techniques for matching current consumption of different battery cell management circuits within a battery management system (BMS). The battery cell management circuits described herein may each include a current sink that is configured to sink a level of supply current to the respective battery cell management circuit. Moreover, the battery cell management circuits may each include a trim circuit (such as a current digital-to-analog converter) configured to apply a trim factor that controls the level of the supply current associated with the current sink circuit. An external processor may be connected to the trim circuit, and the external processor may be capable of adjusting the trim factor applied by the trim circuit. In this way, the current sinking capabilities of the battery cell management circuits are configurable and adjustable during the lifetime of the battery cell management circuits, which can improve the operation of a BMS.

In one example, this disclosure describes a battery cell management circuit configured to manage a plurality of battery cells. For example, the battery cell management circuit may be configured to perform battery cell management functions, such as cell balancing of charge levels on different battery cells and thermal monitoring of the battery cells. According to this disclosure, the battery cell management circuit may comprise a current sink circuit configured to sink a level of supply current to the battery cell management circuit; and a trim circuit configured to apply a trim factor that controls the level of the supply current associated with the current sink circuit, wherein the trim circuit is configured to be connected to an external processor and wherein the trim factor applied by the trim circuit is adjustable based on signals from the external processor.

In another example, this disclosure describes a system (e.g., a BMS) comprising a first battery cell management circuit and a second battery cell management circuit. The first battery cell management circuit may be configured to manage a first subset of a plurality of battery cells, wherein the first battery cell management circuit comprises: a first current sink circuit configured to sink a first level of supply current to the first battery cell management circuit; and a first trim circuit configured to apply a first trim factor that controls the first level of the supply current associated with the first current sink circuit, wherein the first trim circuit is configured to be connected to an external processor and wherein the first trim factor applied by the first trim circuit is adjustable based on first control signals from the external processor. The second battery cell management circuit may be configured to manage a second subset of the plurality of battery cells, wherein the second battery cell management circuit comprises: a second current sink circuit configured to sink a second level of the supply current to the second battery cell management circuit; and a second trim circuit configured to apply a second trim factor that controls the second level of the supply current associated with the second current sink circuit, wherein the second trim circuit is connected to the external processor and wherein the second trim factor applied by the second trim circuit is adjustable based on second control signals from the processor.

In another example, this disclosure describes a method of operating a plurality of battery management circuits of a battery management system associated with an electric device, such as an electric vehicle. The method may comprise adjusting a first trim value associated with a first battery management circuit during operation of the electric device; adjusting a second trim value associated with a second battery management circuit during operation of the electric device; sinking a first amount of current in the first battery management circuit based on the first trim value; and sinking a second amount of current in the second battery management circuit based on the second trim value, wherein sinking the first amount of current and sinking the second amount of current causes the first battery management circuit and the second battery management circuit to consume substantially similar amounts of current.

Details of these and other examples are set forth in the accompanying drawings and the description below. Other features, objects, and advantages will be apparent from the description and drawings, and from the claims.

BRIEF DESCRIPTION OF DRAWINGS

FIG. 4 is a graph showing an example distribution of current consumption amongst different battery modules.

DETAILED DESCRIPTION

Figure 1:
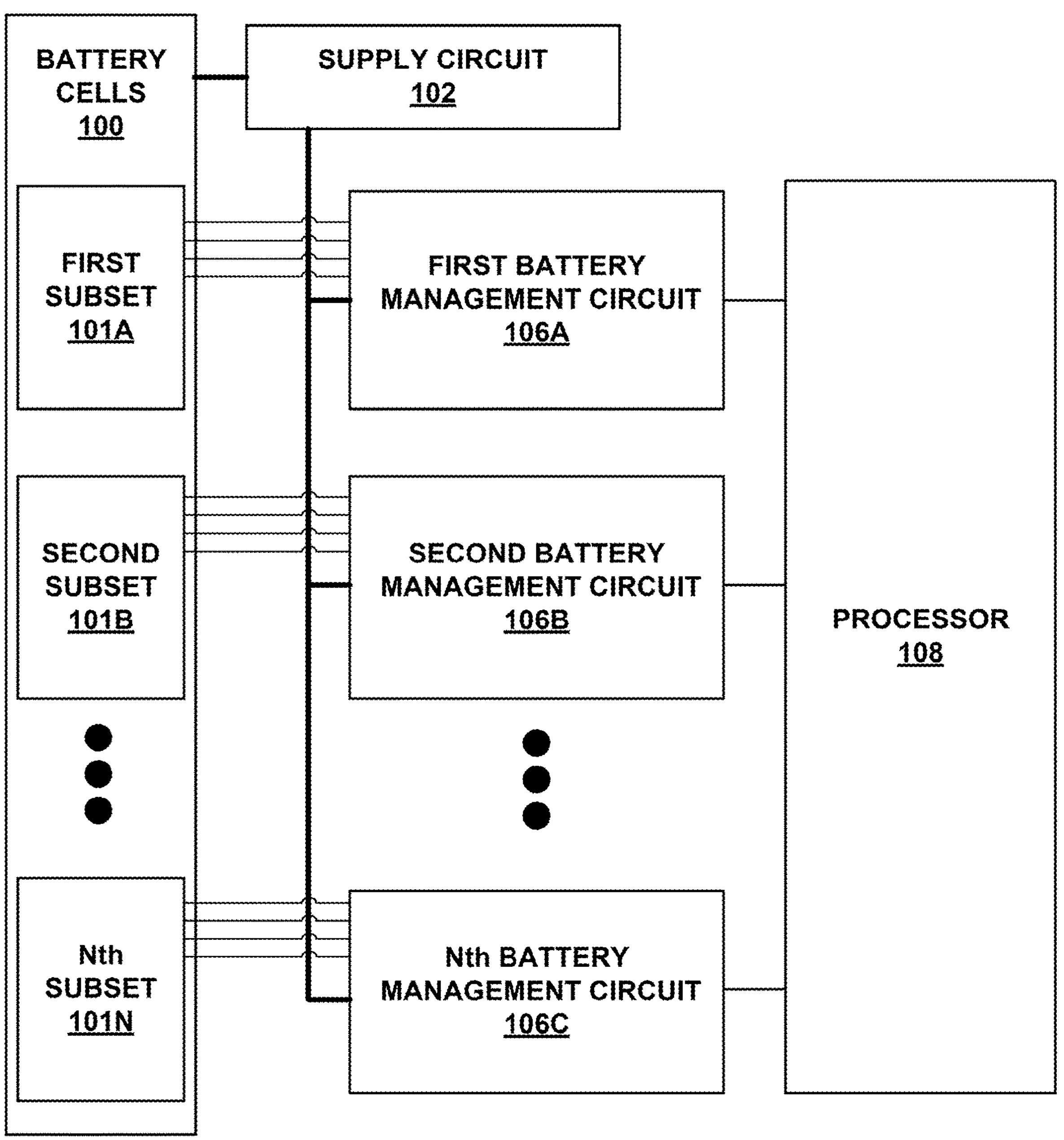
FIG. 1 is a block diagram battery cells and a battery monitoring system (BMS) that includes a supply circuit, a processor, and a plurality of battery cell management circuits.

This disclosure is directed to battery cell management circuits and techniques for matching current consumption of different battery cell management circuits within a battery management system (BMS). The battery cell management circuits described herein may each include a current sink configured to sink a level of supply current to the respective battery cell management circuit. Moreover, the battery cell management circuits may each include a trim circuit (such as a current digital-to-analog converter) configured to apply a trim factor that controls the level of the supply current associated with the current sink circuit. The trim factor may comprise a digital value that defines an amount of current trimming to be applied, and the trim factor is also referred to herein as a "trim value." An external processor may be connected to the trim circuit, and the external processor may be capable of adjusting the trim factor applied by the trim circuit, e.g., via control signals from the external processor that define or adjust the trim factor. In this way, the current sinking capabilities of the battery cell management circuits are configurable and adjustable during the lifetime of the battery cell management circuits.

Battery management circuits may be configured to monitor charge levels (e.g., cell voltage levels) and temperatures of several different battery cells, and these circuits may be configured to perform cell balancing or other battery management functions within a BMS. A BMS associated with an electric device, such as an electric vehicle, may include several battery management circuits in order to monitor different subsets of a plurality of battery cells used by the electric device. In addition to monitoring and balancing the charge levels of different battery cells, it is also desirable to match current consumption among different battery cell management circuits within a BMS. To do so, this disclosure describes the use of configurable current sink circuits within battery management circuits. By configuring (and re-configuring) the level of current sinking by different battery cell management circuits, better current matching can be achieved, which can improve battery and BMS performance.

In BMS systems, measuring the current consumption by the different battery management circuits can be difficult. Indeed, it may be costly and undesirable to measure current consumption directly. Therefore, in some examples, current consumption by different battery management circuits may be monitored indirectly, such as by monitoring the amount of battery cell balancing functions that are performed by the different battery management circuits. The amount of battery cell balancing functions that are performed may correlate with amount of current consumption by battery cell management circuits, and therefore, the amount of battery cell balancing functions performed by a given battery cell management circuit may be used as an indirect indication of current consumption by that given battery cell management circuit. Accordingly, the circuits of this disclosure may use indirect monitoring of current consumption statistics, and the circuits may use this statistical information to configure and reconfigure the battery management circuits in order to better match the current consumption amongst different battery cell management circuits within a BMS.

FIG. 1 is a block diagram showing battery cells and a battery management system (BMS) that includes a supply circuit 102 and a battery monitoring circuits 106A. 106B, 106C to monitor battery cells 100. Battery cells 100 may comprise a set of battery cells connected in series. In order to monitor battery cells, supply circuit 102 uses power from battery cells 100 (or another power supply) to supply electrical current to battery management circuits 106A, 106B, 106C so that battery management circuits 106A, 106B, 106C can monitor each, measuring battery cell temperatures, or other battery cell management functions. Each of battery management circuits 106A, 106B, 106C may be configured and arranged to monitor a different subset of battery cells. For example, as illustrated in FIG. 1, a first battery management circuit 106A is arranged to monitor a first subset 101A of battery cells 100, a second battery management circuit 106B is arranged to monitor a second subset 101B of battery cells 100, and an Nth subset 101N is arranged to monitor an Nth subset 101B of battery cells 100. In this example, N may represent any integer greater than 2. In other words, a BMS may include any number of battery cells and any number of battery cell management circuits.

Battery management circuits 106A, 106B, 106C may be connected to a processor 108, e.g., an external microprocessor. Processor 108 may comprise a BMS system-level processor, or possibly a higher system-level processor of an electric vehicle or other device. In some examples, processor 108 may operate in a low voltage domain (e.g., 12 or 18 volts) and battery cells 100 and battery management circuits 106A, 106B, 106C may operate in a high voltage domain (e.g., greater than 300 volts). In this case, a galvanic isolation barrier may exist between processor 108 and battery management circuits 106A, 106B, 106C to protect processor 108 from the high voltage domain. The galvanic isolation barrier may comprise an electrical transformer, such as stacked coils formed on printed circuit board, or a so-called coreless transformer. In other examples, galvanic isolation barrier may comprise one or more capacitors arranged to provide galvanic isolation to the different sides of the capacitors. Other galvanic isolation techniques may also be used. In any case, control signals can be sent across the galvanic isolation barrier from processor 108 to battery management circuits 106A, 106B, 106C, e.g., to adjust trim factors.

Figure 2:
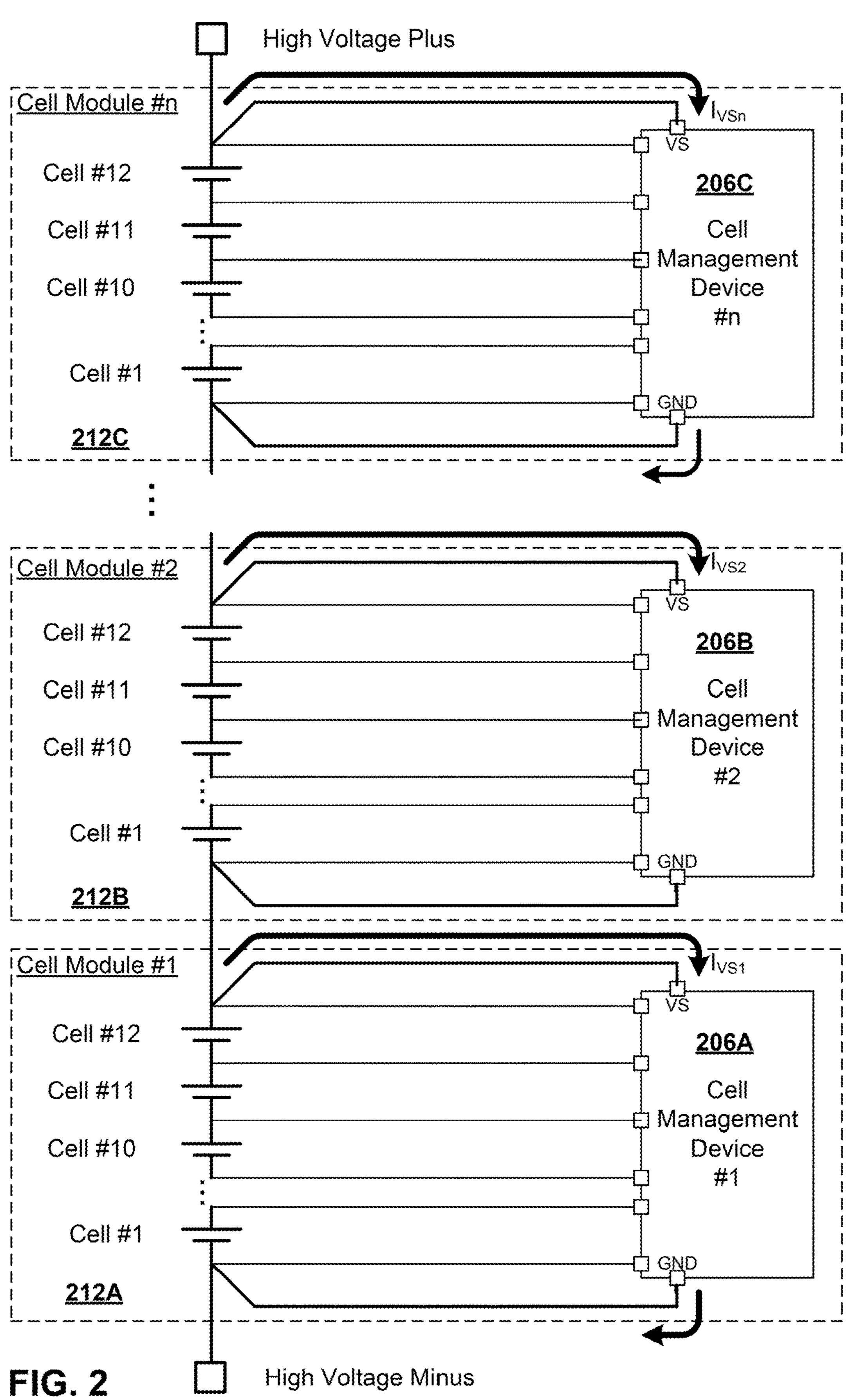
FIG. 2 is a block diagram showing a plurality of battery cell modules that each include a battery cell management device.

FIG. 2 is a block diagram showing a plurality of battery cell modules that each include a battery cell management device. FIG. 2 is consistent with the example shown in FIG. 1. In this case, each battery cell management device is paired with a subset of battery cells within a battery module. In particular, FIG. 2 shows a first battery cell management device 206A associated with twelve battery cells in a first cell module 212A. FIG. 2 also shows a second battery cell management device 206B associated with twelve battery cells in a second cell module 212B, and a third battery cell management device 206C associated with twelve battery cells in a third cell module 212C. The variable "n" shown in FIG. 2 for cell management device 206C may be any integer greater than n=2. In other words, a BMS system like that shown in FIG. 2 may include any number of battery cell management circuits.

A battery cell management circuit (such as battery management circuit 106A, 106B, 106C or cell management device 206A, 206B, 206C) may be configured to manage a plurality of battery cells (e.g., a subset of cells in a larger battery system). According to this disclosure, the battery cell management circuit (e.g., battery management circuit 106A, 106B, 106C or cell management device 206A, 206B, 206C) may comprise a current sink circuit configured to sink a level of supply current to the battery cell management circuit, and a trim circuit configured to apply a trim factor that controls the level of the supply current associated with the current sink circuit, wherein the trim circuit is configured to be connected to an external processor and wherein the trim factor applied by the trim circuit is adjustable based on signals from the external processor. For example, the trim factor may comprise a digital value that defines an amount of current trimming to be applied for sinking extra current. The trim factor may also be referred to as a "trim value." As described in greater detail below, in some examples, the trim circuit may comprise a current digital to analog converter (DAC).

The current sink circuit of a given battery cell management circuit (e.g., battery management circuit 106A, 106B, 106C or cell management device 206A, 206B, 206C) may be configured to sink the level of supply current so that the battery management circuit consumes an amount of current that substantially matches one or more other battery cell management circuits (e.g., other ones of battery management circuits 106A, 106B, 106C or other ones of cell management devices 206A, 206B, 206C). In other words, as shown in FIG. 2, current sinking by cell management devices 206A, 206B, 206C can be performed to ensure that current consumption $I_{VS1}$, $I_{VS2}$, and $I_{VSn}$ are substantially similar. If current consumption of a battery management circuit or device changes during the lifetime of that device or circuit, the trimming of other circuits or devices may be changed to ensure that current consumption $I_{VS1}$, $I_{VS2}$, and $I_{VSn}$ remains substantially similar. In some examples, current consumption of $I_{VS1}$, $I_{VS2}$, and $I_{VSn}$ may be in a range of approximately 10-30 milliamps (e.g., 20 milliamps), and in this case, current trimming (current sinking based on adjusted trim factors) may be performed by battery management circuits to achieve variations between different battery management circuits of less than approximately 200 microamps (e.g., approximately 100 microamps).

The different trim factors applied by different battery cell management circuits may be adjusted based on signals from an external processor, e.g., processor 108 shown in FIG. 1. Each different battery cell management circuit may include a memory circuit configured to store its trim factor, which can be adjusted or re-configured over time and during the lifetime operation of the battery cell management circuits.

Figure 3:
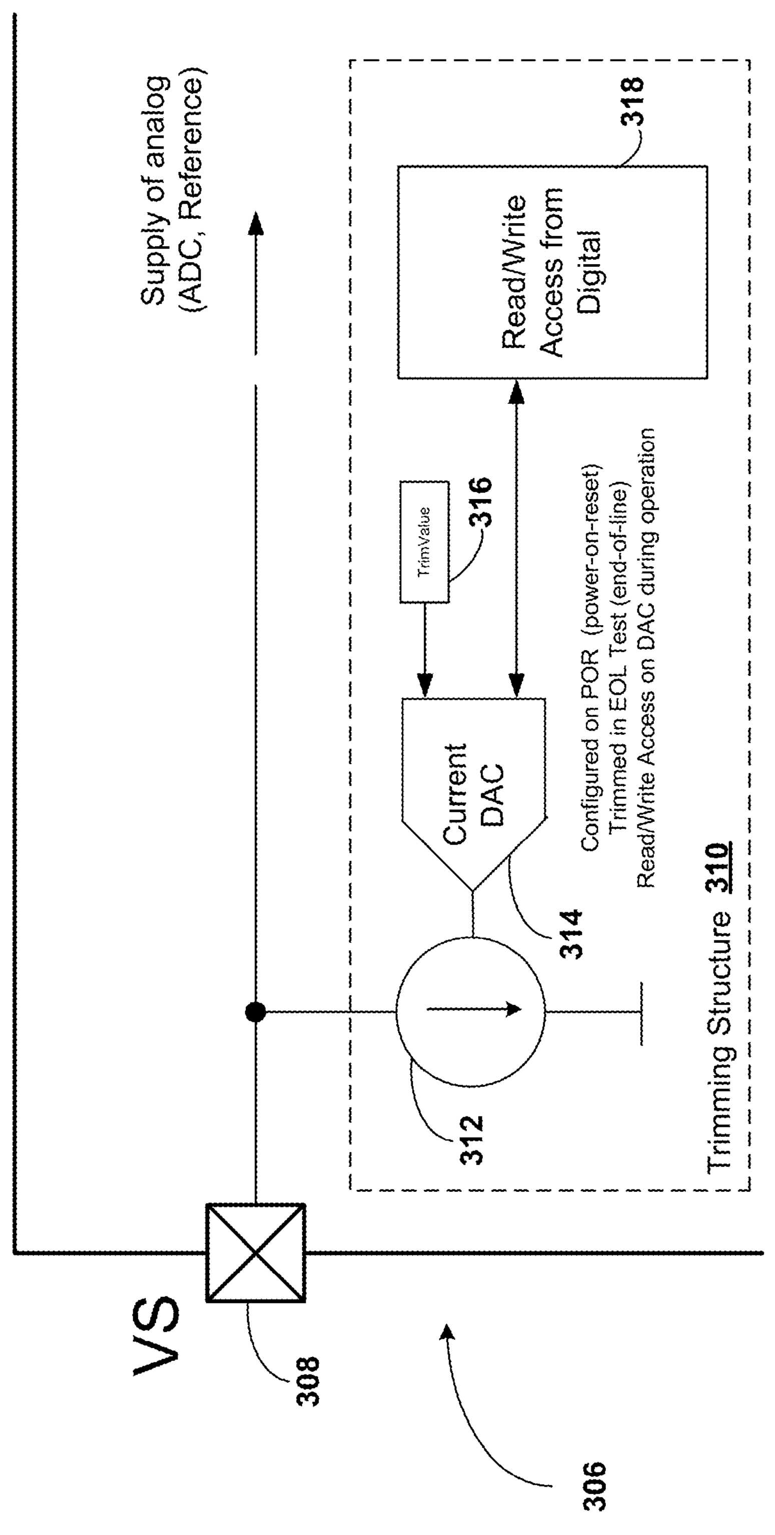
FIG. 3 is a block diagram an example trimming structure circuit, which may be used within battery cell management devices to trim current and facilitate controllable and adjustable current matching between different battery cell modules.

FIG. 3 is a block diagram an example trimming structure circuit 306, which may be included in each battery cell management circuit or device 106A, 106B, 106C, 206A, 206B, 206C, in order to control current trimming and to facilitate controllable and adjustable current matching between different battery cell circuits or modules.

As shown in FIG. 3, a circuit 306 may include a supply pin 308 and a trimming structure 310. Trimming structure 310 may include a current sink circuit 312 that is configured to sink a portion of supply current received at supply pin 308. Current DAC 314 is one example of a trim circuit that is configured to control the level of current that gets sunk by current sink circuit 312, although other type of trimming circuits could be used. The level of trimming may be stored as a trim value 316, which may comprise a digital value stored in a local memory associated with circuit 306.

Current DAC 314 may include read/write access 318 circuit that is configured to receive information from an external digital device, such as processor 108, shown in FIG. 1. In this way, an external processor can configure and re-configure trim value 316 so as to adjust the current trimming applied by current sink circuit 312.

Consistent with the examples of FIG. 1 and FIG. 3, in some cases, a BMS system may comprise a first battery cell management circuit 106A configured to manage a first subset 101A of a plurality of battery cells 100. The first battery cell management circuit 106A may comprise a first current sink circuit 312 configured to sink a first level of supply current to first battery cell management circuit 106A, and a first trim circuit (e.g., a first current DAC 314) configured to apply a first trim factor (e.g., a first trim value 316) that controls the first level of the supply current associated with first current sink circuit 312. As shown in FIG. 3, the first trim circuit (e.g., the first current DAC 314) is configured to be connected to an external processor and, therefore, the first trim factor (e.g., a first trim value 316) applied by the first trim circuit (e.g., the first current DAC 314) is adjustable based on first control signals from the external processor. In this way, the circuit of FIG. 3 may be included within first battery cell management circuit 106A of FIG. 1.

Moreover, the circuit of FIG. 3 may also be duplicated within second and third battery cell management circuits 106B and 106C of FIG. 1, albeit with different trim factors. Thus, a second battery cell management circuit 106B, which may be configured to manage a second subset 101B of the plurality of battery cells 101, may comprise a second current sink circuit 312 configured to sink a second level of supply current to second battery cell management circuit 106B, and a second trim circuit (e.g., a second current DAC 314) configured to apply a second trim factor (e.g., a second trim value 316) that controls the second level of the supply current associated with second current sink circuit 312. As shown in FIG. 3, the second trim circuit (e.g., the second current DAC 314) is configured to be connected to an external processor and, therefore, the second trim factor (e.g., the second trim value 316) applied by the second trim circuit (e.g., the second current DAC 314) is adjustable based on first control signals from the external processor. In this way, the circuit of FIG. 3 may be included within second battery cell management circuit 106B of FIG. 1. Of course, the trim factors (e.g., trim value 316 shown in FIG. 3) may be different for first battery cell management circuit 106A and for second battery cell management circuit 106B such that they sink different amounts of current so as to achieve current consumption matching between first battery cell management circuit 106A and second battery cell management circuit 106B. In other words, a first current sink circuit 312 associated with first battery cell management circuit 106A and a second current sink circuit 312 associated with second battery cell management circuit 106B can be configured to cause the first battery management circuit 106A to consume a first amount of current that substantially matches a second amount of current consumed by the second battery management circuit 106B.

As further shown in FIG. 1, a BMS system may include N battery cell management circuits configured to manage N subsets of the plurality of battery cells, wherein N is a positive integer greater than 2. Each of the battery management circuits may include the circuit of FIG. 3, configured with different trim values 316.

As described in greater detail below, in some examples, processor 108 may be configured to collect statistics associated with a plurality of battery cell management circuits 106A, 106B, 106C, and adjust trim factors associated with each of battery cell management circuits 106A, 106B, 106C based on the statistics. However, measuring the actual current consumption by the different battery management circuits can be difficult. Indeed, it may be costly and undesirable to measure current consumption directly. Therefore, in some examples, current consumption by different battery management circuits 106A, 106B, 106C may be monitored indirectly, such as using processor 108 to collect statistics on the amount of battery cell balancing functions that are performed by the different battery management circuits 106A, 106B, 106C.

Accordingly, in some examples, processor 108 may collect indirect current consumption statistics associated with battery management circuits 106A, 106B, 106C, and processor 108 may be configured to adjust (e.g., increase) a particular trim factor associated with a particular one of the plurality of battery management circuits 106A, 106B, 106C that has lower current consumption than other ones of the plurality of battery management circuits. If a given battery management circuit has lower current consumption, which may be due to lower levels of battery management functions being performed, that battery management circuit may benefit from more current sinking to ensure that its current usage matches that of other battery management circuits in the BMS that do not consume as much current in their operation.

In some examples, processor 108 may collect cell balancing statistics, as an indirect indicator of current consumption. The amount of cell balancing functions performed may be an indirect indicator of current consumption insofar as battery management circuits that perform more cell balancing functions generally consume less current than battery management circuits that perform fewer cell balancing functions. Therefore, processor 108 may collect cell balancing statistics and use these statistics to determine current consumption. Accordingly, in some examples, processor 108 may be configured to adjust a particular trim factor associated with a particular one of the plurality of battery management circuits that has higher instances of cell balancing events than other ones of the plurality of battery management circuits.

In some examples, processor 108 is configured to analyze the statistics at specifically defined instances of time, such as at each start-up associated with a device that is powered, at least in part, by the plurality of battery cells 100. For example, with an electrical vehicle, processor 108 is configured to analyze the statistics at each start-up of the electrical vehicle. In other examples, it may be useful to check statistics more often or less often.

In some examples, upon checking statistics, e.g., at each start up or at another defined point in time, processor 108 may be configured to adjust the trim factors associated with the N battery management circuits 106A, 106B, 106C based on the statistics in response to the statistics demonstrating variations in current consumption among the N battery management circuits 106A, 106B, 106C. Moreover, in some examples, processor 108 may be configured to expand an observation window of the statistics to a next start-up in response to the statistics demonstrating no variations in current consumption among the N battery management circuits. Thus, if the statistics show current consumption mismatch, trim factors can be adjusted to achieve better matching of current consumption among battery management circuits 106A, 106B, 106C, but if the statistics do not demonstrate current consumption mismatch, then the observation window for the statistics can be extended, e.g., to the next start up. In this way, the gathering of statistics may continue for longer and longer periods of time if no changes are made to the trimming, which can improve the statistics and the accuracy of the current matching over time.

A first battery cell management circuit 106A may be configured to perform cell balancing of charge levels on the first subset 101A of the plurality of battery cells 100 and thermal monitoring of the first subset 101A of the plurality of battery cells 100. A second battery cell management circuit 106B may be configured to perform cell balancing of charge levels on the second subset 101B of the plurality of battery cells 100 and thermal monitoring of the second subset 101B of the plurality of battery cells 100. Again, the number of charge balancing tasks performed by first battery cell management circuit 106A and by second battery cell management circuit 106B can be tracked by processor 108 and used by processor 108 to define the amount of current consumed by first battery cell management circuit 106A and by second battery cell management circuit 106B. First battery cell management circuit 106A may include a first memory circuit connected to a first trim circuit (e.g., current DAC 314), wherein the first memory circuit is configured to store a first trim factor 316. Similarly, second battery cell management circuit 106B may include a second memory circuit connected to a second trim circuit (e.g., another instance of current DAC 314), wherein the second memory circuit is configured to store the second trim factor 316. The second trim factor 316 associated with second battery cell management circuit 106A is another instance of trim factor 316, which is different than the first instance of trim factor 316 associated with first battery cell management circuit 106A.

Referring again to the example shown in FIG. 3, each cell module 212A, 212B, 212C may include a set of battery cells connected in series, each cell module 212A, 212B, 212C may include a cell management device 206A, 206B, 206C. Cell management devices 206A, 206B, 206C may comprise circuits that are configured to measure voltage of each cell and temperature of cells and in the respective module. Cell management devices 206A, 206B, 206C may also perform functions to balance cell charge levels so that all battery cells in the system can operate in their safe-operating-area. In some examples, each respective cell management device may be supplied with power from the cells within its respective module.

Cell balancing of charge levels may occur for each cell individually, and the same connection used for cell balancing may also be used for cell monitoring. In general, cell balancing is desirable in the system to utilize the full performance of the cells and ensure longevity of the battery system, but the cell balancing process itself may be undesirable in an automotive high voltage battery (with passive balancing) because the balancing can dissipate energy that could be used otherwise. If there is charge level imbalance (and thus the need for balancing), the cell balancing is performed, but in some cases, cell charge level balancing steps may be minimized as much as possible.

There are many causes for charge imbalance within a battery, some of which are predictable and some of which are unpredictable. Production can cause variance in capacitance, which may cause predictable charge imbalance based on production quality. Production can cause variance in so-called "self discharge rate" of cells, which may also cause predictable charge imbalance based on production quality. Circuit aging factors, on the other hand, may cause unpredictable charge imbalances. Cell discharge due to operation of the cell management device is yet another factor, which can be addressed by adjusting current trimming based on cell balancing statistics.

Also, the quality of state-of the art battery cell chemistries may be such that current consumption variation of the cell management devices can impact the battery balancing. For example, referring to FIG. 2, if $I_{VS2}$ is significantly higher than the other cell management devices, the cells of battery cell module 212B are discharged more than those of battery cell modules 212A and 212C. In this case, current consumption of other battery cell modules 212A and 212C can be matched to that of battery cell module 212B by adjusting the current trim factor and the current sinking that is performed by battery cell modules 212A and 212C.

Battery cell management devices may specify current consumption within a narrow range. With a current trimming process, the device current consumption can only be increased. For example, an artificial increase of the device current consumption may be performed to the highest untrimmed current consumption within all production process variations. Techniques of this disclosure, in some examples, may achieve target guaranteed consumption variation in the range of 0.1 mA.

On cell management device-level, according to this disclosure, each cell management device can be configured to include an adjustable and controllable trimming value, which is readable from a higher-level control unit, e.g., processor 108, which may comprise a microcontroller in battery management unit (BMU). A digital input value to the trimming-structure, e.g., trim value 316, can be modified during runtime operation of a battery management circuit. A writeable control register or other memory circuit may be included in each battery cell management device to store trim value 316.

At a system level, additional features and advantages can be achieved by the circuits and techniques of this disclosure. A system may control and supervise current consumption by different battery management circuits, such as by a main controller in a battery management unit (BMU). Over a period of several charging/discharging cycles-including several balancing events-processor 108 can perform statistical evaluation/pattern recognition on module level to adjust the current consumption of each battery management circuit relative to other battery management circuits in the system so that the balancing cycles are minimized. In some cases, if the current consumption by a given battery management circuit/device has a significant impact, then this would be visible in the statistical data (e.g., distribution of accumulated balancing times on a per-module basis) and even very small variances could be detected by longer measurement periods.

In some examples, the circuits and techniques of this disclosure may achieve better precision in current consumption matching from module to module without additional testing or production efforts. Reduced testing efforts (e.g., test-time reduction and simplified test program) can be used, as the need for precision measurement can be shifted to a system level function that adjusts trim factors during run time to achieve current matching among different battery management circuits/device. In some examples, recalibration can be performed during the lifetime of devices, and lifetime-readjustment of current consumption may react to variations, changes, or drift of battery properties over the lifetime of the circuits. Cell property variations are not necessarily linear from device to device, so periodic recalibration of current sinking functions can compensate for such variations, which can change over time.

FIG. 4 is a graph showing an example distribution of current consumption amongst different battery modules. Current consumption variation may have distribution, which in this example is a bell curve. Devices on the far left of the bell curve may have very low current consumption relative to most devices, and devices on the far right of the bell curve have very high current consumption relative to most devices. The majority of devices may have current consumption in the middle of the bell curve, at or near the peak of the bell curve. For all devices to match, the current sinking of all devices needs to match the worst-case current consumption device on the right side of the bell curve, which may require substantial current sinking by the other devices.

Current consumption matching, however, is not required for all devices within the distribution shown in FIG. 4. Instead, current consumption matching may be performed with respect to those devices used in the same BMS. By performing current matching relative to a worst case within the BMS (rather than the worst case of the entire production of battery management circuits), efficiencies can be achieved.

Figure 5:
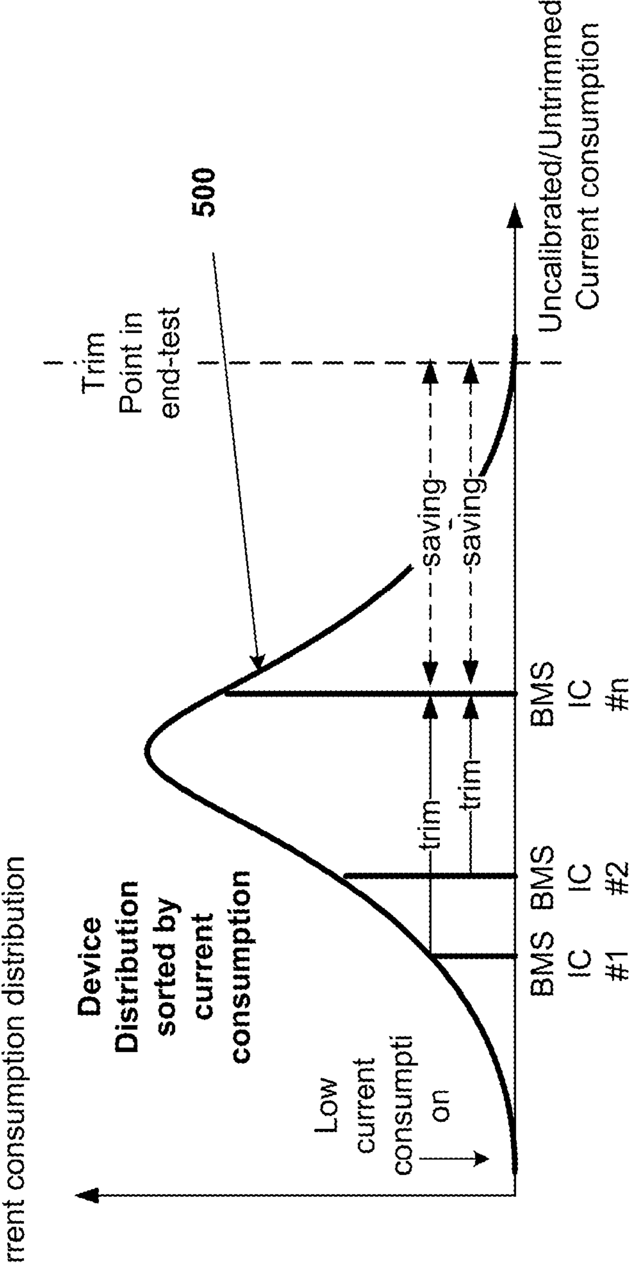
FIG. 5 is another graph showing some aspects of this disclosure.

FIG. 5 is another graph showing some aspects of this disclosure. The bell curve of FIG. 5 is similar to that of FIG. 4. However, FIG. 5 shows how the battery management circuits (e.g., called BMS IC's in FIG. 5) can be current matched with other devices in the same BMS to achieve efficiencies. In this case, BMS IC #n may define the worst-case current consumption circuit within a given BMS. Accordingly, for that BMS, current sinking and trimming for BMS IC #1 and BMS IC #2 can be matched to BMS IC #n, which achieves current consumption savings relative to current matching to the worst case scenario of the entire production of circuits shown by the bell curve of FIG. 5. In other words, according to this disclosure, the artificial increase of the current consumption by a current sinking circuit within a battery management circuit can be reduced from that associated with the highest current consumption device that is manufactured to that associated with the highest current consumption device within a given BMS. As shown in FIG. 5 (e.g., near location 500), the device used in the battery with the highest current consumption defines the current consumption for all other devices. In some examples, if all cell management devices in a system have encountered an artificial increase of the current consumption, then this unneeded consumption can be reduced down-to the "real" (=un-trimmed) current consumption of the device that has the highest untrimmed consumption.

Figure 6:
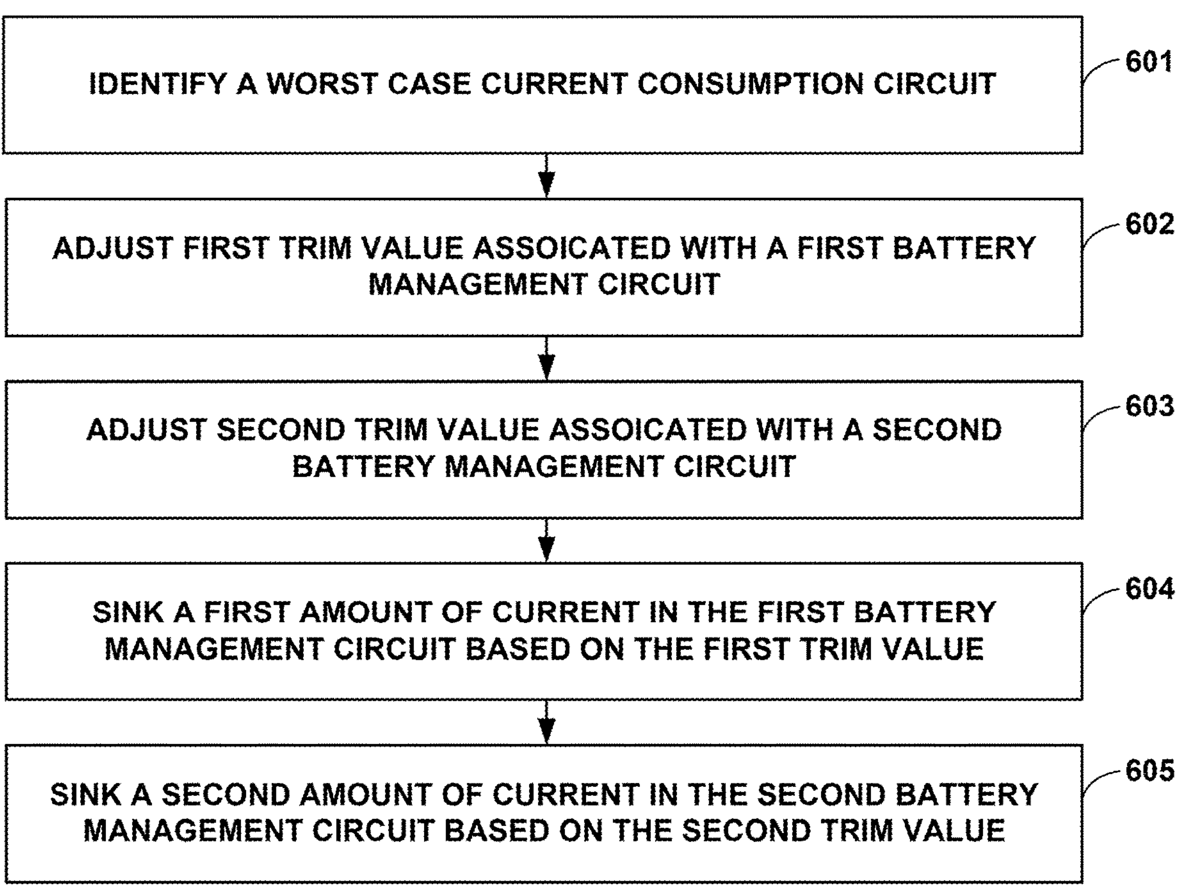
FIGS. 6 and 7 are flow diagrams consistent with techniques of this disclosure.

FIG. 6 is a flow diagram consistent with techniques of this disclosure. FIG. 6 will be described from the perspective of the BMS shown in FIG. 1, although other systems could perform the techniques. The battery management circuits shown in FIG. 1 may each include the circuit of FIG. 3.

As shown in FIG. 6, trim values are selected for a plurality of battery management circuits by first identifying a worst-case current consumption circuit (601). This step identifying the worst-case current consumption circuit may occur at an initial manufacturing and verification stage in some examples, but this step may also occur during operation of the BMS in the field. Thus, for the latter case, if the current consumption changes for any reason during operation of the BMS (e.g., due to aging, cell balancing, battery chemistry changes, or any reason), then the trimming may be adjusted, based on a new worst-case current consumption circuit. In the example shown in FIG. 6, step 601 may correspond to identifying BMS IC #n of FIG. 6, in which case other circuits of the BMS can be tuned to the current consumption of BMS IC #n of FIG. 6.

After identifying the worst-case current consumption circuit within a BMS system (601), which may correspond to an Nth battery management circuit 106C, the BMS system adjusts a first trim value associated with a first battery management circuit 106A (602). In this case, the first trim value associated with first battery management circuit 106A may be that needed to ensure that first battery management circuit 106A consumes a similar amount of current as the worst-case current consumption circuit, which in this example, corresponds to Nth battery management circuit 106C.

The BMS system also adjusts a second trim value associated with a second battery management circuit 106B (603). Like the first trim value, the second trim value associated with second battery management circuit 106B may be that needed to ensure that second battery management circuit 106B consumes a similar amount of current as the worst-case current consumption circuit, which in this example, corresponds to Nth battery management circuit 106C.

In operating the BMS, after adjusting the trim values, first battery management circuit 106A sinks a first amount of current based on the first trim value (604) and second battery management circuit 106B sinks a second amount of current based on the second trim value (605).

Consistent with FIG. 6, in some examples, a method of operating a plurality of battery management circuits of a battery management system associated with an electric device may comprise adjusting a first trim value associated with a first battery management circuit during operation of the electric device, adjusting a second trim value associated with a second battery management circuit during operation of the electric device, sinking a first amount of current in the first battery management circuit based on the first trim value, and sinking a second amount of current in the second battery management circuit based on the second trim value, wherein sinking the first amount of current and sinking the second amount of current causes the first battery management circuit and the second battery management circuit to consume substantially similar amounts of current. The method may also include operating N battery management circuits associated with N subsets of a plurality of battery cells, wherein N is a positive integer greater than 2, wherein the method comprises selecting the first and second trim values based on a particular one of the N battery cells that consumes a highest amount of current.

For example, the method may include selecting a trim value of zero for the particular one of the N battery cells that consumes the highest amount of current, e.g., BMS IC #n shown in FIG. 4. In this case, the method may include selecting the first trim value and the second trim value (e.g., for other BMS ICs in the same BMS) as relative values in relation to the trim value of zero associated with BMS IC #n shown in FIG. 4. For example, adjusting the first and second trim factors may be performed based on signals from a processor 108 to the different battery management circuits of the BMS.

Moreover, as further described herein, processor 108 may collect statistics associated with the plurality of battery cell management circuits in that BMS, wherein the first battery management circuit and the second battery management circuit are part of the plurality of battery management circuits in that BMS. In this case, a method may further include adjusting a plurality of trim factors associated with the plurality of battery management circuits based on the statistics. As described herein, the statistics may comprise indirect indicators of current consumption of battery management circuits, such as cell balancing statistics or other statistics of circuit functions that may correlate with current consumption.

Figure 7:
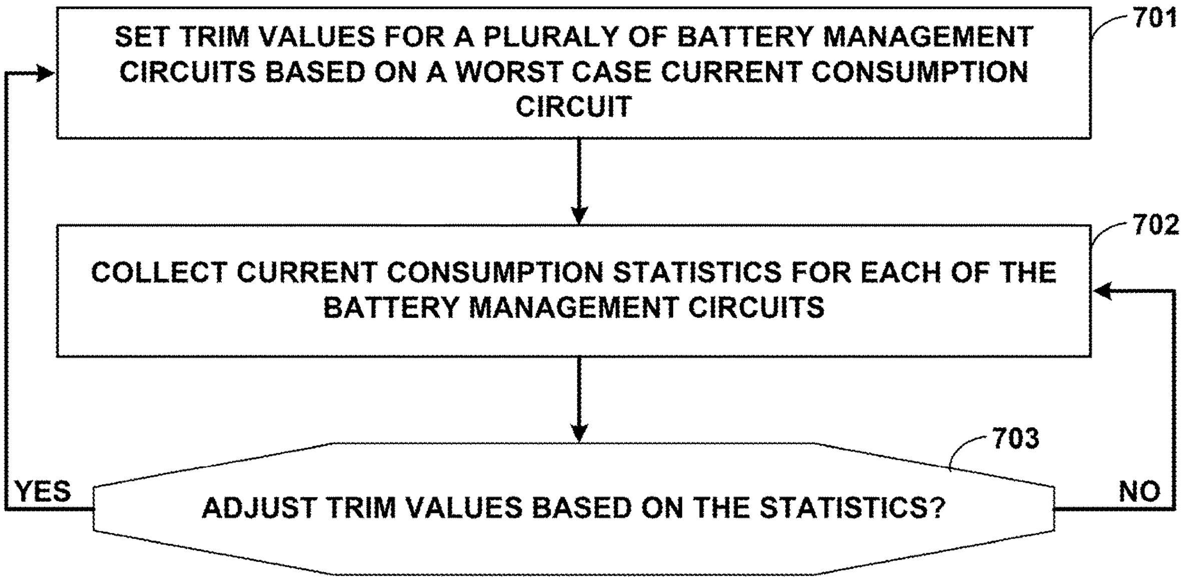

As shown in FIG. 7, a processor 108 may set the trim values for a plurality of battery management circuits (701), e.g., cell management circuits 106A, 106B, 106C. Processor 108 collects current consumption statistics for each of the battery management circuits (702). The statistics may comprise direct measures of current consumption, e.g., via a shunt or other current measuring apparatus, but more preferably, the statistics may comprise indirect measures of current consumption, such as a measure of the number of cell balancing functions performed by each of the battery management circuits. Processor 108 may then determine, based on the statistics, whether to adjust the trim values (703). If the circuits can benefit from trim value adjustment (yes branch of 703), processor 108 may reset the trim values for the plurality of battery management circuits based on worst case current consumption circuit in the system (701), which may change over time. If the circuits would not benefit from trim value adjustment (no branch of 703), processor 108 may continue to collect addition current consumption statistics (702), essentially extending an observation window.

The techniques described in this disclosure may be implemented, at least in part, in circuitry, hardware, software, firmware or any combination thereof. For example, various aspects of the described techniques may be implemented within one or more logical elements, processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

It may also be possible for one or more aspects of this disclosure to be performed in software, in which case those aspects of the techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, or other computer readable media.

The following clauses may illustrate one or more aspects of the disclosure.

Clause 1—A battery cell management circuit configured to manage a plurality of battery cells, the battery cell management circuit comprising: a current sink circuit configured to sink a level of supply current to the battery cell management circuit; and a trim circuit configured to apply a trim factor that controls the level of the supply current associated with the current sink circuit, wherein the trim circuit is configured to be connected to an external processor and wherein the trim factor applied by the trim circuit is adjustable based on signals from the external processor.

Clause 2—The battery cell management circuit of clause 1, wherein the trim circuit comprises a current DAC.

Clause 3—The battery cell management circuit of clause 1 or 2, wherein the current sink circuit is configured to sink the level of supply current so that the battery cell management circuit consumes an amount of current that substantially matches one or more other battery cell management circuits.

Clause 4—The battery cell management circuit of any of clauses 1-3, wherein the trim factor is adjusted based on signals from the external processor.

Clause 5—The battery cell management circuit of any of clauses 1-4, wherein the battery cell management circuit is configured to perform cell balancing of charge levels on the plurality of battery cells and thermal monitoring of the plurality of battery cells.

Clause 6—The battery cell management circuit of any of clauses 1-5, further comprising a memory circuit connected to the trim circuit, wherein the memory circuit is configured to store the trim factor.

Clause 7—A system comprising: a first battery cell management circuit configured to manage a first subset of a plurality of battery cells, wherein the first battery cell management circuit comprises: a first current sink circuit configured to sink a first level of supply current to the first battery cell management circuit; and a first trim circuit configured to apply a first trim factor that controls the first level of the supply current associated with the first current sink circuit, wherein the first trim circuit is configured to be connected to an external processor and wherein the first trim factor applied by the first trim circuit is adjustable based on first control signals from the external processor; and a second battery cell management circuit configured to manage a second subset of the plurality of battery cells, wherein the second battery cell management circuit comprises: a second current sink circuit configured to sink a second level of the supply current to the second battery cell management circuit; and a second trim circuit configured to apply a second trim factor that controls the second level of the supply current associated with the second current sink circuit, wherein the second trim circuit is connected to the external processor and wherein the second trim factor applied by the second trim circuit is adjustable based on second control signals from the external processor.

Clause 8—The system of clause 7, wherein the first trim circuit comprises a first current DAC; and wherein the second trim circuit comprises a second current DAC.

Clause 9—The system of clause 7 or 8, further comprising: N battery cell management circuits configured to manage N subsets of the plurality of battery cells, wherein N is a positive integer greater than 2.

Clause 10—The system of any of clauses 7-9, wherein the first current sink circuit and the second current sink circuit are configured to cause the first battery cell management circuit to consume a first amount of current that substantially matches a second amount of current consumed by the second cell battery management circuit.

Clause 11—The system of any of clauses 7-10, further comprising the external processor.

Clause 12—The system of clause 11, wherein the external processor is configured to: collect statistics associated with a plurality of battery cell management circuits, wherein the first battery cell management circuit and the second battery cell management circuit are part of the plurality of battery cell management circuits; and adjust trim factors associated with the plurality of battery cell management circuits based on the statistics.

Clause 13—The system of clause 12, wherein the statistics comprise indirect current consumption statistics and wherein the external processor is configured to adjust a particular trim factor associated with a particular one of the plurality of battery management circuits that has lower current consumption than other ones of the plurality of battery management circuits.

Clause 14—The system of clause 13, wherein the indirect current consumption statistics comprise cell balancing statistics and wherein the external processor is configured to adjust a particular trim factor associated with a particular one of the plurality of battery management circuits that has lower instances of cell balancing events than other ones of the plurality of battery management circuits.

Clause 15—The system of any of clauses 12-14, wherein the external processor is configured to analyze the statistics at each start-up associated with a device that is powered, at least in part, by the plurality of battery cells, wherein the external processor is further configured to: adjust the trim factors associated with the N battery management circuits based on the statistics in response to the statistics demonstrating variations in current consumption among the N battery management circuits; and expand an observation window of the statistics to a next start-up in response to the statistics demonstrating no variations in current consumption among the N battery management circuits.

Clause 16—The system of any of clauses 7-15, wherein the first battery cell management circuit is configured to perform cell balancing of charge levels on the first subset of the plurality of battery cells and thermal monitoring of the first subset of the plurality of battery cells, and wherein the second battery cell management circuit is configured to perform cell balancing of charge levels on the second subset of the plurality of battery cells and thermal monitoring of the second subset of the plurality of battery cells.

Clause 17—The system of any of clauses 7-16, wherein the first battery cell management circuit includes a first memory circuit connected to the first trim circuit, wherein the first memory circuit is configured to store the first trim factor and wherein the second battery cell management circuit includes a second memory circuit connected to the second trim circuit, wherein the second memory circuit is configured to store the second trim factor.

Clause 18—A method of operating a plurality of battery management circuits of a battery management system associated with an electric device, the method comprising: adjusting a first trim value associated with a first battery management circuit during operation of the electric device; adjusting a second trim value associated with a second battery management circuit during operation of the electric device; sinking a first amount of current in the first battery management circuit based on the first trim value; and sinking a second amount of current in the second battery management circuit based on the second trim value, wherein sinking the first amount of current and sinking the second amount of current causes the first battery management circuit and the second battery management circuit to consume substantially similar amounts of current.

Clause 19—The method of clause 18, wherein the method operates N battery management circuits associated with N subsets of a plurality of battery cells, wherein N is a positive integer greater than 2, wherein the method comprises: selecting the first and second trim values based on a particular one of the N battery cells that consumes a highest amount of current.

Clause 20—The method of clause 19, further comprising: selecting a trim value of zero for the particular one of the N battery cells that consumes the highest amount of current; and selecting the first trim value and the second trim value as relative values in relation to the trim value of zero.

Clause 21—The method of any of clauses 18-20, further comprising: adjusting the first and second trim factors based on signals from a processor.

Clause 22—The method of clause 21, further comprising: collecting, via the processor, statistics associated with the plurality of battery cell management circuits, wherein the first battery management circuit and the second battery management circuit are part of the plurality of battery management circuits; and adjusting, via the processor, a plurality of trim factors associated with the plurality of battery management circuits based on the statistics.

Various aspects and examples have been described in this disclosure. These and other aspects and examples are within the scope of the following claims.

The invention claimed is:

1. A battery cell management circuit configured to manage a plurality of battery cells, the battery cell management circuit comprising:

a current sink circuit configured to sink a level of supply current to the battery cell management circuit; and a trim circuit configured to apply a trim factor that controls the level of the supply current associated with the current sink circuit, wherein the trim circuit is configured to be connected to an external processor and wherein the trim factor applied by the trim circuit is adjustable based on signals from the external processor.

2. The battery cell management circuit of claim 1, wherein the trim circuit comprises a current digital to analog converter (DAC).

3. The battery cell management circuit of claim 1, wherein the current sink circuit is configured to sink the level of supply current so that the battery cell management circuit consumes an amount of current that substantially matches one or more other battery cell management circuits.

4. The battery cell management circuit of claim 1, wherein the trim factor is adjusted based on signals from the external processor.

5. The battery cell management circuit of claim 1, wherein the battery cell management circuit is configured to perform cell balancing of charge levels on the plurality of battery cells and thermal monitoring of the plurality of battery cells.

6. The battery cell management circuit of claim 1, further comprising a memory circuit connected to the trim circuit, wherein the memory circuit is configured to store the trim factor.

7. A system comprising:

a first battery cell management circuit configured to manage a first subset of a plurality of battery cells, wherein the first battery cell management circuit comprises:

a first current sink circuit configured to sink a first level of supply current to the first battery cell management circuit; and a first trim circuit configured to apply a first trim factor that controls the first level of the supply current associated with the first current sink circuit, wherein the first trim circuit is configured to be connected to an external processor and wherein the first trim factor applied by the first trim circuit is adjustable based on first control signals from the external processor; and a second battery cell management circuit configured to manage a second subset of the plurality of battery cells, wherein the second battery cell management circuit comprises:

a second current sink circuit configured to sink a second level of the supply current to the second battery cell management circuit; and a second trim circuit configured to apply a second trim factor that controls the second level of the supply current associated with the second current sink circuit, wherein the second trim circuit is connected to the external processor and wherein the second trim factor applied by the second trim circuit is adjustable based on second control signals from the external processor.

8. The system of claim 7, wherein the first trim circuit comprises a first current digital to analog converter (DAC); and wherein the second trim circuit comprises a second current DAC.

9. The system of claim 7, further comprising:

N battery cell management circuits configured to manage N subsets of the plurality of battery cells, wherein N is a positive integer greater than 2.

10. The system of claim 7, wherein the first current sink circuit and the second current sink circuit are configured to cause the first battery cell management circuit to consume a first amount of current that substantially matches a second amount of current consumed by the second battery cell management circuit.

11. The system of claim 7, further comprising the external processor.

12. The system of claim 11, wherein the external processor is configured to:

collect statistics associated with a plurality of battery cell management circuits, wherein the first battery cell management circuit and the second battery cell management circuit are part of the plurality of battery cell management circuits; and adjust trim factors associated with the plurality of battery cell management circuits based on the statistics.

13. The system of claim 12, wherein the statistics comprise indirect current consumption statistics and wherein the external processor is configured to adjust a particular trim factor associated with a particular one of the plurality of battery cell management circuits that has lower current consumption than other ones of the plurality of battery management circuits.

14. The system of claim 13, wherein the indirect current consumption statistics comprise cell balancing statistics and wherein the external processor is configured to adjust a particular trim factor associated with a particular one of the plurality of battery cell management circuits that has lower instances of cell balancing events than other ones of the plurality of battery cell management circuits.

15. The system of claim 12, wherein the external processor is configured to analyze the statistics at each start-up associated with a device that is powered, at least in part, by the plurality of battery cells, wherein the external processor is further configured to:

adjust the trim factors associated with the N battery management circuits based on the statistics in response to the statistics demonstrating variations in current consumption among the N battery cell management circuits; and expand an observation window of the statistics to a next start-up in response to the statistics demonstrating no variations in current consumption among the N battery management circuits.

16. The system of claim 7, wherein the first battery cell management circuit is configured to perform cell balancing of charge levels on the first subset of the plurality of battery cells and thermal monitoring of the first subset of the plurality of battery cells, and wherein the second battery cell management circuit is configured to perform cell balancing of charge levels on the second subset of the plurality of battery cells and thermal monitoring of the second subset of the plurality of battery cells.

17. The system of claim 7, wherein the first battery cell management circuit includes a first memory circuit connected to the first trim circuit, wherein the first memory circuit is configured to store the first trim factor and wherein the second battery cell management circuit includes a second memory circuit connected to the second trim circuit, wherein the second memory circuit is configured to store the second trim factor.

18. A method of operating a plurality of battery management circuits of a battery management system associated with an electric device, the method comprising:

adjusting a first trim value associated with a first battery management circuit during operation of the electric device;

adjusting a second trim value associated with a second battery management circuit during operation of the electric device;

sinking a first amount of current in the first battery management circuit based on the first trim value; and sinking a second amount of current in the second battery management circuit based on the second trim value, wherein sinking the first amount of current and sinking the second amount of current causes the first battery management circuit and the second battery management circuit to consume substantially similar amounts of current.

19. The method of claim 18, wherein the method operates N battery management circuits associated with N subsets of a plurality of battery cells, wherein N is a positive integer greater than 2, wherein the method comprises:

selecting the first and second trim values based on a particular one of the N subsets of battery cells that consumes a highest amount of current.

20. The method of claim 19, further comprising:

selecting a trim value of zero for the particular one of the N subsets of battery cells that consumes the highest amount of current; and selecting the first trim value and the second trim value as relative values in relation to the trim value of zero.

21. The method of claim 18, further comprising:

adjusting the first and second trim values based on signals from a processor.

22. The method of claim 21, further comprising:

collecting, via the processor, statistics associated with the plurality of battery management circuits, wherein the first battery management circuit and the second battery management circuit are part of the plurality of battery management circuits; and adjusting, via the processor, a plurality of trim values associated with the plurality of battery management circuits based on the statistics.

* * * * *